(12) United States Patent
Thompson et al.

(10) Patent No.: US 6,870,643 B2
(45) Date of Patent: Mar. 22, 2005

(54) METHOD AND SYSTEM FOR ERROR DIFFUSION WITH A PLURALITY OF ERROR MEASURES

(75) Inventors: Gerhard Robert Thompson, Wappingers Falls, NY (US); Steven Lorenz Wright, Cortlandt Manor, NY (US); Chai Wah Wu, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 950 days.

(21) Appl. No.: 09/774,067

(22) Filed: Jan. 31, 2001

(65) Prior Publication Data

US 2002/0140955 A1 Oct. 3, 2002

(51) Int. Cl.[7] .......................... H04N 1/405; H04N 1/52; G09G 5/00
(52) U.S. Cl. .................. 358/3.05; 358/3.06; 358/534; 345/596; 345/597; 345/616
(58) Field of Search .................. 358/1.9, 3.03–3.06, 358/3.26, 3.27, 534–536; 345/596–597, 616; 382/252

(56) References Cited

U.S. PATENT DOCUMENTS

| | | | | |
|---|---|---|---|---|
| 6,061,143 A | * | 5/2000 | Schweid et al. | 358/1.9 |
| 6,091,858 A | * | 7/2000 | Yoshida | 358/3.05 |
| 6,353,687 B1 | * | 3/2002 | Schweid | 382/252 |
| 6,476,934 B1 | * | 11/2002 | Ilbery et al. | 358/3.04 |
| 6,556,214 B1 | * | 4/2003 | Yamada et al. | 345/616 |
| 6,603,575 B2 | * | 8/2003 | Schweid et al. | 358/3.26 |

* cited by examiner

*Primary Examiner*—Scott A. Rogers
(74) *Attorney, Agent, or Firm*—Stephen C. Kaufman, Esq.; McGinn & Gibb, PLLC (57) ABSTRACT

A method (and system) for producing a halftoned image, includes calculating errors corresponding to a plurality of different viewing conditions of a halftone image, and minimizing a function of the errors, such that the halftone image appears as a different image under different viewing conditions. Alternatively, in another embodiment, the halftoned image appears as the same image under different viewing conditions.

44 Claims, 6 Drawing Sheets

FIG.1A

For each k                     /* rows */
  for each l                  /* columns */
    for each j               /* viewing condition */
$$M_j(k,l) = N_j(k,l) + \sum_{u,v} w_j(u,v) e_j(k-u,l-v)$$
    endfor $$t = \arg \min_i \sum_j |M_j(k,l) - a_{ij}|$$

$o(k,l) = c_t$
    for each j               /* viewing condition */
$$e_j(k,l) = M_j(k,l) - a_{tj}$$
      if $e_j(k,l) > \text{UPBOUND}_j$ then $e_j(k,l) = \text{UPBOUND}_j$
      if $e_j(k,l) > \text{LOBOUND}_j$ then $e_j(k,l) = \text{LOBOUND}_j$
    endfor
  endfor
endfor

METHOD AND SYSTEM FOR ERROR DIFFUSION WITH A PLURALITY OF ERROR MEASURES

BACKGROUND OF THE INVENTION

1. Field of the Invention

The present invention generally relates to halftoning techniques in printers and displays and, more particularly, to a method and apparatus for halftoning with a display or printing medium such that the displayed (or printed) image pixels have different characteristics depending on conditions of the viewing environment such as viewing angle, temperature and lighting conditions.

The inventive halftoning method and apparatus generate a halftoned output such that a different image is displayed under each condition of the viewing environment.

2. Description of the Related Art

Most printers and displays show images which look relatively the same under different viewing conditions. However, this is not true for all printing technologies and displays. For instance, for a type of LCD (Liquid Crystal Display) display commonly used in laptop computers, the image pixels change color and brightness drastically as the viewing angle is changed. Other examples include inks which change color or density, as the temperature is changed, or inks which change color or density when the printed paper is illuminated with ultraviolet light.

Given images $N_1, N_2, \ldots$ a problem arises of how to generate an image such that it looks like $N_1$ under viewing condition 1, it looks like $N_2$ under viewing condition 2, etc.

Further, because images printed by a printer or displayed on a display can change color characteristics as the conditions of the viewing environment change, another problem arises as to how to generate images which look the same even as these viewing conditions change.

Other systems exist which display two or more images depending on viewing angles, such as those used on decals, baseball cards, etc. There are several differences between these systems and the present invention. First, these printed papers in the conventional systems are designed to display different images at different angles, and thus no special processing of the image is needed. In the present invention, the display (or printing medium) is not specifically designed to display different images at different viewing conditions, and therefore the present invention teaches methods to process the images so that the display will show different images under different viewing conditions.

Second, the conventional systems mainly deal with different viewing angles, whereas the present invention can also be applied to showing different images under different lighting conditions, temperature, etc.

Third, the conventional systems are mainly applicable to printed images, whereas the present invention is also applicable to displays which can accommodate video.

SUMMARY OF THE INVENTION

In view of the foregoing and other problems of the conventional methods and systems, an object of the present invention is to provide a system and method which can generate an image such that it looks like $N_1$ under viewing condition 1, it looks like $N_2$ under viewing condition 2, etc.

Another object is to maintain color characteristics of images printed by a printer or displayed on a display as the conditions of the viewing environment change, and to generate images which look the same even as these viewing conditions change.

In a first aspect of the present invention, a method (and system) for producing a halftoned image, includes calculating errors corresponding to a plurality of different viewing conditions of a halftone image, and minimizing a function of the errors, such that the halftoned image appears as a different image under different viewing conditions.

In a different aspect, the halftoned image appears as the same image under different viewing conditions.

Conditions of the viewing environment include variables such as temperature, viewing angle, humidity, lighting conditions, etc. Herein, these will be termed viewing conditions for short. A specific viewing condition could be viewing the display (or printed output) at a specific angle (or angle ranges) or the like.

In the following discussion, whenever a display" is referred to, it should be understood that this includes any output device, such as a laptop LCD display, printer, cathode ray tube (CRT), etc.

At each pixel, the display can display one color out of a set of colors $\{c_1, c_2, \ldots, c_n\}$.

Given a color $c_i$, the actual color seen by the viewer under viewing condition j will be denoted $a_{ij}$. $a_{ij}$ can be a scalar for grayscale or a three-dimensional vector for color in RGB, LAB, CMY, XYZ or other color spaces. An introduction to color spaces can be found in "Color Technology for Electronic Imaging Devices", H. R. Kang, SPIE Press, 1997. It is clear how this formulation is also valid for other high dimensional color spaces.

In classical error diffusion halftoning, halftoning errors from previous pixels are added to the input pixel resulting in the modified input. The displayable color closest to the modified input is then displayed. The difference between the modified input and the printed (displayed) color is the halftoning error which is propagated to neighboring pixels.

Error diffusion and other halftoning techniques are described in the book "Digital Halftoning" by R. Ulichney, MIT Press, 1987.

Assume that images $N_1, N_2, \ldots$ are given. By using $a_{ij}$ instead of $c_1$ and choosing $N_j$, an error $e_j$ corresponding to the viewing condition j for halftoning image $N_j$ can be obtained. In the present invention, a halftoned image is generated which attempts to minimize the aggregate error which is a function of the $e_j$'s.

Thus, with the unique and unobvious aspects of the present invention, an image can be generated such that it looks like $N_1$ under viewing condition 1, it looks like $N_2$ under viewing condition 2, etc.

Further, in a different aspect, color characteristics can be maintained of images printed by a printer or displayed on a display as the conditions of the viewing environment change. Thus, images can be generated which look the same even as the viewing conditions change.

Hence, with the invention, several different error measures can be considered and the color selected minimizes the error measures jointly by minimizing an aggregate of the error measures.

Typically, error diffusion methods result in selecting one color from a limited set of colors at each pixel. Traditionally, error diffusion tries to minimize the error between what image is output and what the original image actually is. Typically, an attempt is made to pick the right color such that at a distance the output appears the same as the original.

However, in contrast to the conventional methods, there are a plurality (e.g., two or more) of errors considered in the present invention. For example, there may be one error looking at an image at one viewing condition (e.g., angle, temperature, lighting condition, etc.) and displaying it, and there may be another error in viewing the same image at another viewing condition (e.g., angle, temperature, etc.) and displaying it. Thus, there are two errors, but the conventional methods attempt to minimize only one of them.

In the inventive method, the error diffusion is performed by minimizing an aggregate of the errors (e.g., at the same time), not just one error or the other as in conventional error diffusion. Thus, colors are selected to minimize the errors at each pixel.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Referring now to the drawings, and more particularly to FIGS. 1A–5, there are shown preferred embodiments of the method and structures according to the present invention.

Figure 1A:
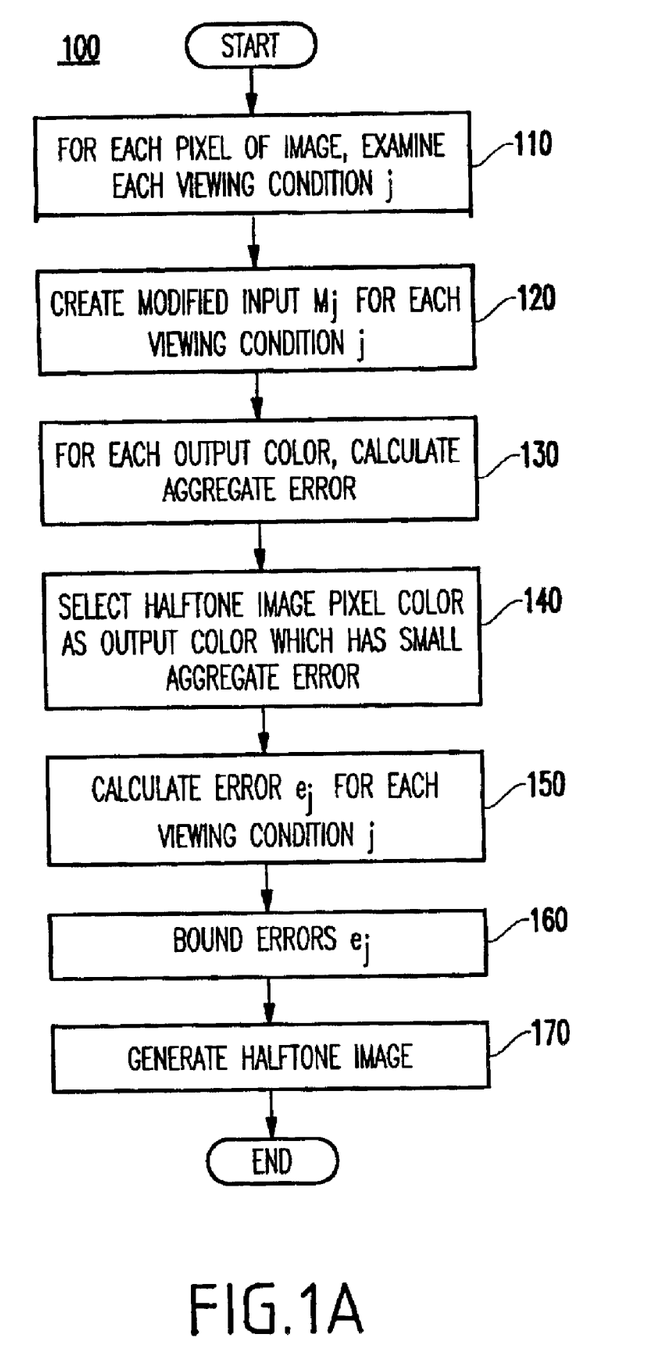
FIG. 1A illustrates a flow diagram of a method for performing error diffusion with a plurality of error measures according to a preferred embodiment of the invention.
Figure 1B:
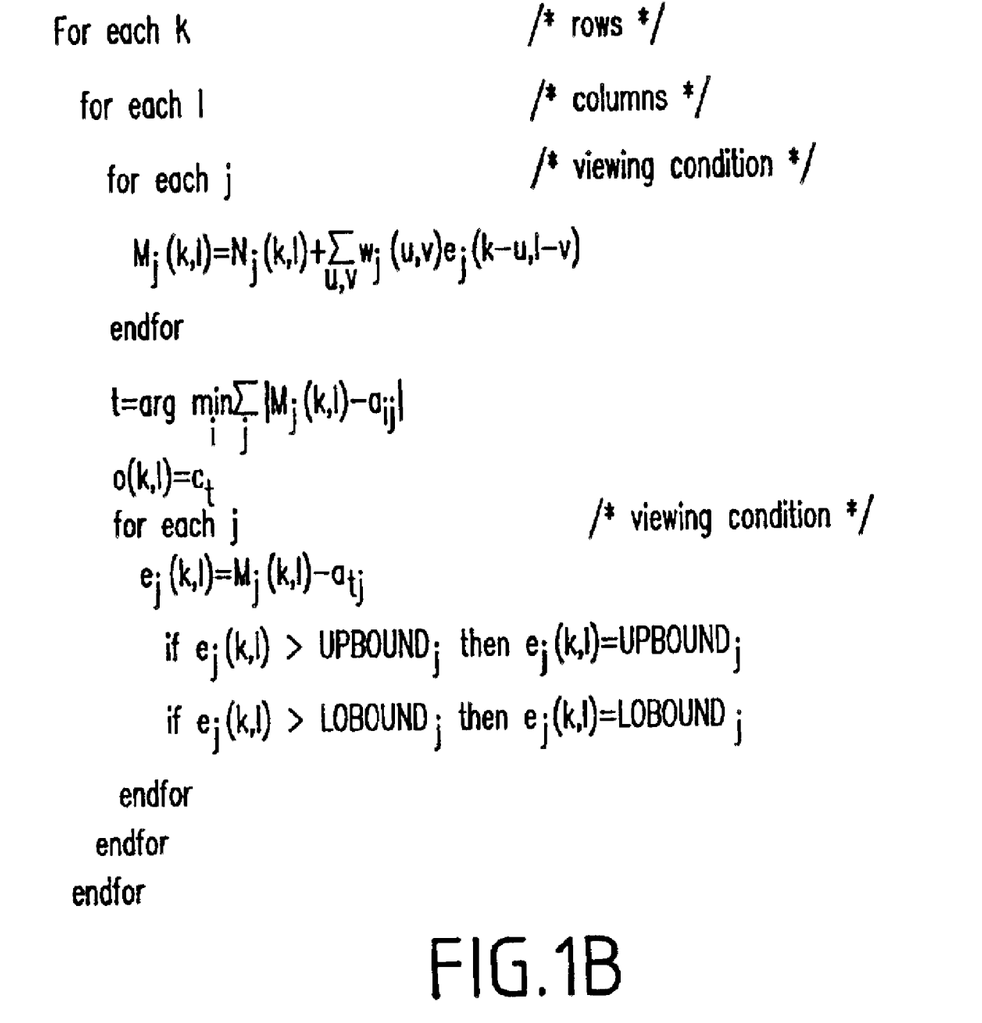
FIG. 1B illustrates the preferred embodiment of the invention of FIG. 1 in pseudo-code form.

FIG. 1A illustrates a flow chart of the inventive method 100, and FIG. 1B illustrates the inventive method in pseudo-code form.

In FIG. 1A–1B, there are three loops in the process such that a loop is made through each column k and rows 1 of the image (e.g., through each pixel).

Figure 2A:
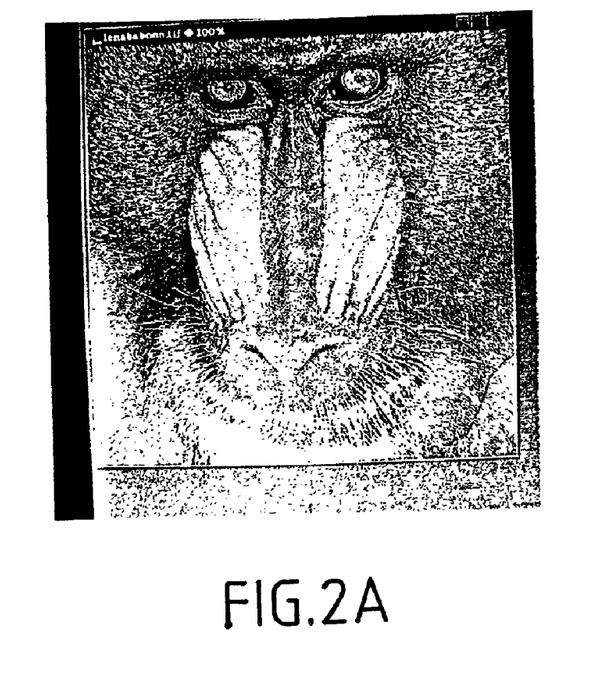
FIG. 2A is an image generated from the prescribed algorithm viewed on a LCD display from one angle.
Figure 2B:
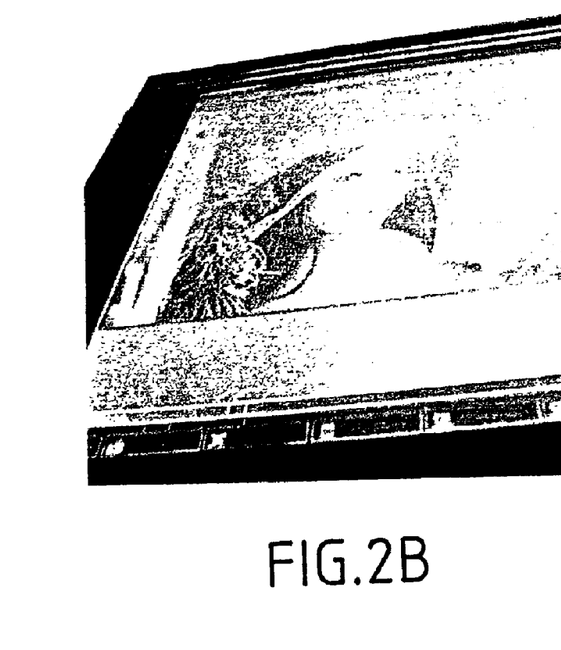
FIG. 2B is the same image as FIG. 2A viewed from another angle.

That is, in step 110, for each pixel of the image (e.g., at the intersection of the columns and rows), a loop is made through each viewing condition. In the example of FIGS. 2A–2B, there are only two viewing conditions shown for simplicity (e.g., one showing the baboon and one showing the woman).

In step 120, for each viewing condition, a modified input $M_j$ is created. In error diffusion, instead of using an input, a modified input is used (created) by adding to the current input pixel N a weighted sum ($w_j$) of errors ($e_j$) that have been generated in the past (e.g., errors propagated through).

Once the modified inputs are generated, then, in step 130 for example, the aggregate error is calculated for each possible output color. The aggregate error can be chosen as the sum of the errors for each viewing condition.

In step 140, the color for the halftone image output pixel is chosen as the output color which has a small (or the lowest) aggregate error.

In step 150, the error $e_j$ that can occur by selecting a particular output then is found for each viewing condition j. That is, a particular output is subtracted from the modified output M.

Then, in step 160, for each j, an upper and lower bound is applied to the error such that the error does not grow too large in magnitude. Thus, the error is clamped at an upper bound and a lower bound if it becomes too large. Hence, if the error is larger than the upper bound, it is clamped at the upper bound value. A similar operation is performed at the lower bound if the error is smaller than the lower bound.

Finally, in step 170, an output of the halftone image is generated such that the appearance of the image changes as the viewing conditions change.

Hence, given images $N_1, N_2, \ldots$, the system and method of the present invention create a halftoned image which looks like image $N_j$ under viewing condition j for each j. The images $N_1, N_2, \ldots$, will be termed as being embedded into the halftoned image. $N_j(k,l)$ will be denoted as the (k,l)th pixel of image $N_j$. Each pixel of $N_j$ is a scalar or a vector, depending on whether the image is a grayscale image or a color image.

Furthermore, the pixels of each image $N_j$ can be represented in different color spaces (i.e., $N_1$ can be in RGB space, $N_2$ can be in LAB space, $N_3$ can be used in CMY space, etc.). For each image, the corresponding colors $a_{ij}$ and $M_j(k,l)$ are represented in the same color space as the image. Using the notation as above, the modified input for viewing condition j is defined as $$M_j(k, l) = N_j(k, l) + \sum_{u,v} w_j(u, v) e_j(k-u, l-v)$$

where $e_j(k, l)$ is the error corresponding to viewing condition j at the (k, l)th pixel. The aggregate error in the preferred embodiment at the (k, l)th pixel for choosing $c_1$ as the output pixel color is given by:

$$Err(i, k, l) = \sum_j |M_j(k, l) - a_{ij}|$$

This definition of Err is based on a $L_1$ norm. It is clear how other definitions of Err can be possible. For example, Err based on a $L_2$ norm is defined as:

$$Err(i, k, l) = \left(\sum_j |M_j(k, l) - a_{ij}|^2\right)^{1/2}$$

and Err based on a weighted $L_1$ norm is defined as $$Err(i, k, l) = \sum_j n_j |M_j(k, l) - a_{ij}|$$

where $n_j$ are the weighting terms.

The output pixel color at the (k,l)th pixel is then defined as:

$$o(k, l) = c_t \text{ where } t = \underset{i}{\text{argmin}} Err(i, k, l)$$

(i.e., o(k, l) is the printable color $c_t$ which minimizes the aggregate error Err).

The error e (k,l) is defined as $M_j(k,l)-a_{mj}$ if and only if $o(k,l)=c_m$.

$w_j$ is the error weights matrix corresponding to the error diffusion algorithm. For instance, if Jarvis error diffusion (e.g., see Ulichney mentioned above) is used for each j, then $w_j$ will be defined as shown below in Table 1.

TABLE 1

| | | | u | | | |
|---|---|---|---|---|---|---|
| | $w_j(u,v)$ | 2 | 1 | 0 | 1 | 2 |
| v | 0 | 0 | 0 | 0 | 7/48 | 5/48 |
| | 1 | 3/48 | 5/48 | 7/48 | 5/48 | 3/48 |
| | 2 | 1/48 | 3/48 | 5/48 | 3/48 | 1/48 |

Thus, Table 1 shows the weighting factors that can be exemplary used. To prevent the error from growing too large, if $e_j(k,l)>\text{UPBOUND}_j$ then $e_j(k,l)$ is set to $\text{UPBOUND}_j$. Similarly, if $e_j(k,l)<\text{LOBOUND}_j$ then $e_j(k,l)$ is set to $\text{LOBOUND}_j$. $\text{UPBOUND}_j=10$ and $\text{LOBOUND}_j=10$ are set for all j in a preferred embodiment.

It is clear to one skilled in the art that the present invention can be adapted to many variations of error diffusion, such as using different error weights, or using error weights which are input dependent (e.g., see U.S. Pat. No. 6,006,011, incorporated herein by reference) etc.

In general, for printers, the number of printable colors is small (i.e., 2 for a black-and-white printer, and 8 for a CMYK bilevel color printer).

In general, for displays, the list of displayable colors can be quite large. For 8-bit grayscale, the number of displayable colors can be as much as 256 which is still manageable. For 24-bit RGB color, the number of displayable colors can be too large to implement the present invention efficiently. In that case, the images can be split into their RGB channels (or LAB channels or any appropriate color channels) and apply the present invention to each channel independently. In this case, all images should be expressed in the same color space. Another solution is to restrict the number of displayable colors to a manageable size, which depends on the processing speed of the hardware responsible for implementing the present invention.

The present invention is shown in FIG. 1B in pseudo-code form. As mentioned above, the halftoned image is given by o, i.e., o(k,l) is the (k,l)th pixel of the output halftoned image.

One of the applications of the present invention is to display different images depending on the viewing conditions.

Another application is to display images of warning messages for certain viewing conditions, such as when the temperature is too high, the viewing angle is too low, etc.

The present invention also can be used to limit the viewing conditions under which the intended image can be viewed by embedding other images for the unintended viewing conditions.

Another application is in counterfeit protection, where temperature-sensitive inks are used and a second image only appears when the printed paper is heated up by placing a finger on it. Such technology is currently used, but the second image is usually very simple and bilevel, such as an image of the word "authentic". The present invention allows more complicated multilevel images to be embedded as a security feature. Similarly the same can be done with inks which are sensitive to ultraviolet light and the second image will appear when the document is illuminated with a ultraviolet light source.

FIG. 2A shows a halftoned image generated from the present invention when viewed from one viewing angle on an LCD display for the case when the image is a grayscale image. That is, FIG. 2A shows an image of a baboon Two viewing conditions are used corresponding to two different viewing angles and 4 grayscale output colors are used as shown in Table 2 below.

TABLE 2

| | i | | | |
|---|---|---|---|---|
| | 1 | 2 | 3 | 4 |
| $c_i$ | 0 | 40 | 180 | 255 |
| $a_{i1}$ | 0 | 40 | 180 | 255 |
| $a_{i2}$ | 0 | 115 | 3 | 255 |

Thus, Table 2 shows the 4 output colors $c_1$ and how they appear under viewing condition $1(a_{i1})$ and viewing condition $2(a_{i2})$. The two viewing conditions are the viewing angles as defined by the angle between the viewer's viewing direction and the normal direction (the perpendicular direction) of the image.

FIG. 2B shows the same halftoned image viewed from another viewing angle. As shown, the image is now of a young woman. Another application is to increase the robustness of the image under varying viewing conditions (i.e., the printed (or displayed) image should look the same under different viewing conditions). In this case, the images $N_1$, $N_2$, . . . are chosen to be the same image.

Figure 2C:
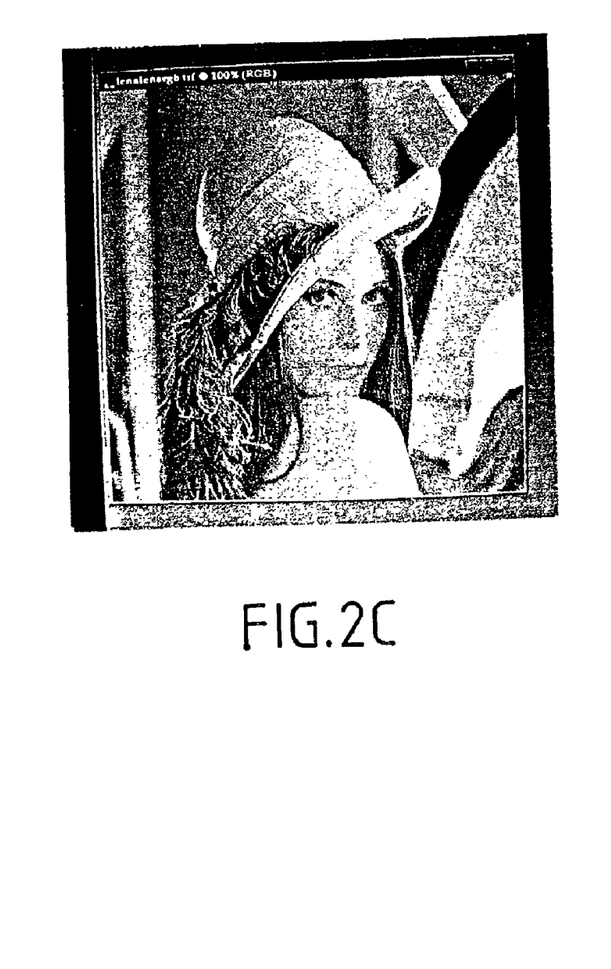
FIG. 2C is a color image generated from the prescribed algorithm viewed on an LCD display from one angle.
Figure 2D:
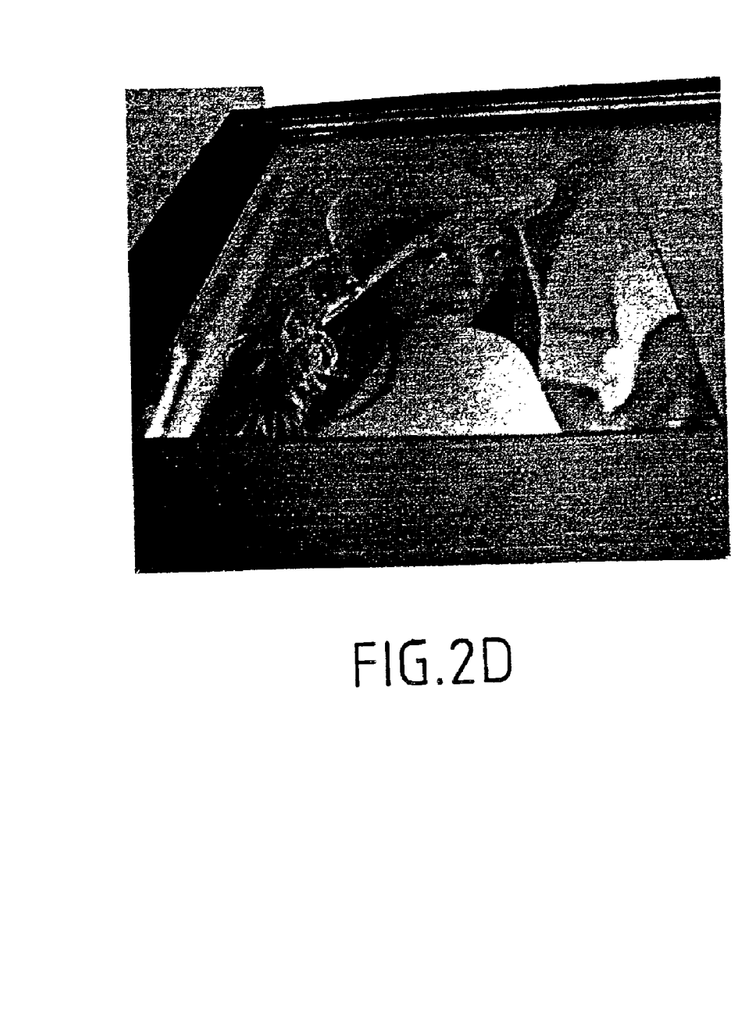
FIG. 2D is the same image as FIG. 2C viewed from another angle (in contrast to FIGS. 2A–2B, the same image is embedded in the two viewing angles so that the same image of a young woman appears under both viewing angles.)

For example, a halftoned image was generated where the same color image was embedded in the two viewing angles. In this case, the image is into its RGB channels and the algorithm is applied to each color channel using Table 2. FIG. 2C and FIG. 2D show this image as viewed under the two viewing angles respectively. One sees that the same image of a young woman appears under the two viewing conditions.

Since video can be decomposed as a series of still images, the present invention also can be used to embed several video sequences in a display, each of which can be seen under different viewing conditions.

If the color does not change much under a different viewing condition, then it is very unlikely that the image will appear substantially different under different viewing conditions. Therefore, to successfully embed several very different images, the sequences $\{a_{ij}\}$ as a function of i should be very different for different j. For instance, in the example above, $\{a_{i1}\}$ is monotonic, while $\{a_{i2}\}$ is not. In the gray-scale case, preferably, the following condition should hold: for each viewing condition j, assign one of the two labels "light" or "dark". For any such combination of labels for the viewing conditions, there exists a index i such that $a_{ij}$ for each j corresponds to the chosen label, i.e. $a_{ij}$ is dark if viewing condition j has label "dark", $a_{ij}$ is light if viewing condition j has label "light", for each viewing condition j. For example, for two viewing conditions, the two curves shown in FIG. 3 will work well.

Figure 3:
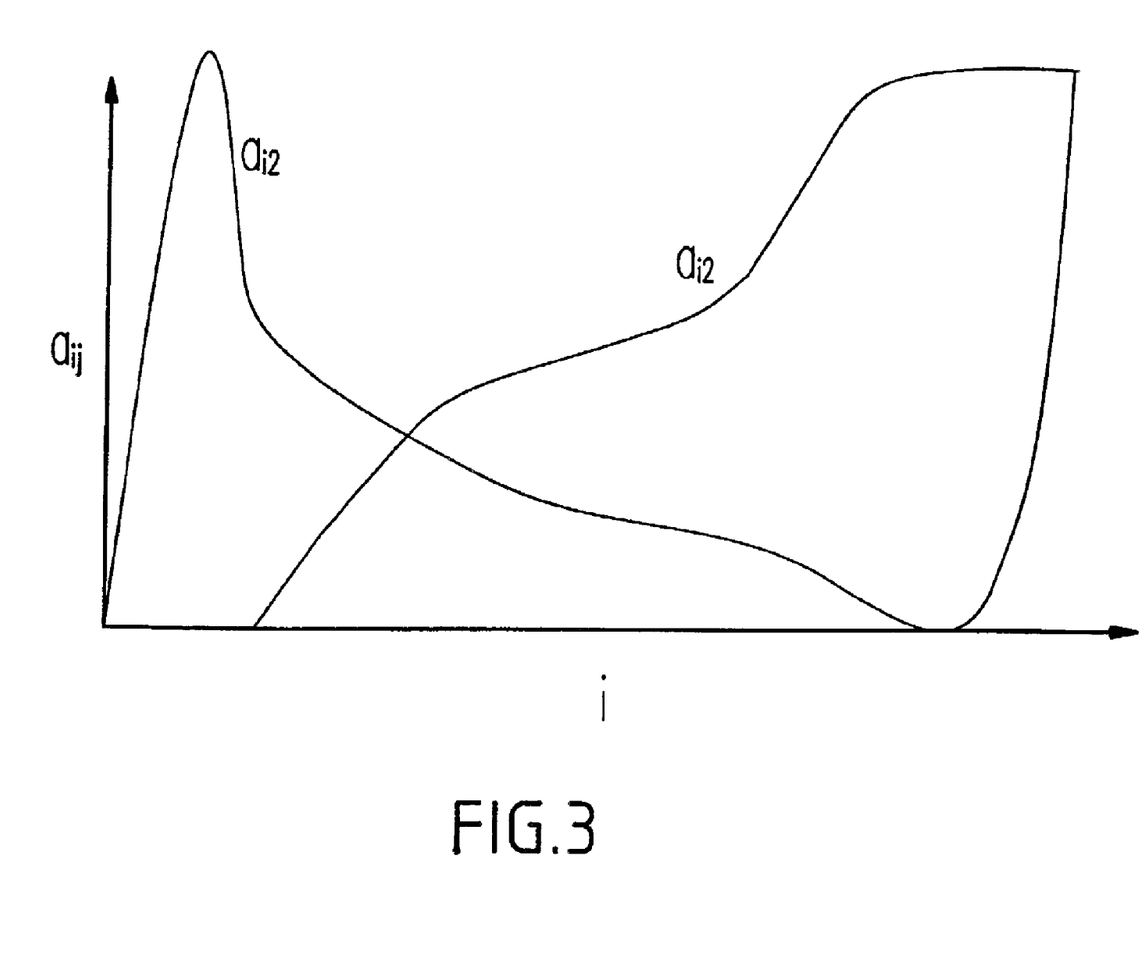
FIG. 3 shows curves for $a_{i1}$ and $a_{i2}$ which would work well to embed two images.

FIG. 3 shows a scheme (conditions) in which the images will appear different and will allow the image(s) to look different under two different viewing conditions. In particular, FIG. 3 illustrates two curves showing how the gray levels (color) of the image pixels depend upon the input i for the two viewing conditions.

That is, a relationship is shown between the input value and the perceived color of the image pixels for the two viewing conditions. In an idealized image pixel, a linear relationship would exist in which as the input becomes greater, the color becomes darker. Hence, for example, $a_{i1}$ is the gray level of a normalized pixel under one viewing condition. Thus, as the brightness is increased (e.g., the input), the darkness of the pixel is increased monotonically.

The second curve $a_{i2}$ illustrates the same image pixel under a second, different viewing condition. As shown, a small amount of input (e.g., turning the image pixel on slightly) will result in very dark pixel, and when the input is increased more then the pixel becomes lighter until the very end of the curve. Hence, in the second curve, the input value and the perceived color have almost an inverse relationship. As shown, at some point of the horizontal axis i, there is a case of when the first viewing condition is low and the second condition is high, or vice versa, or some cases when the first and second viewing conditions are both low (e.g., at the beginning of the curves where i is almost 0) and are both high (e.g. at the end of the curve where i is large).

As shown below in Table 3, for the following values of $c_i$ and $a_{ij}$;

TABLE 3

| | i | | | |
|---|---|---|---|---|
| | 1 | 2 | 3 | 4 |
| $c_i$ | 0 | 1 | 254 | 255 |
| $a_{i1}$ | 0 | 0 | 255 | 255 |
| $a_{i2}$ | 0 | 255 | 0 | 255 | there is a simple interpretation of the resulting invention. That is, two images are independently halftoned by bilevel error diffusion. At each pixel position, the pixels of the two halftoned images form a pixel pair of one of the following four forms: (0, 0), (0, 255), (255, 0) and (255, 255), from which the output color is chosen as 0, 1, 254, 255, respectively.

While the overall methodology of the invention is described above, the invention can be embodied in any number of different types of systems and executed in any number of different ways, as would be known by one ordinarily skilled in the art.

Figures 4, 5:
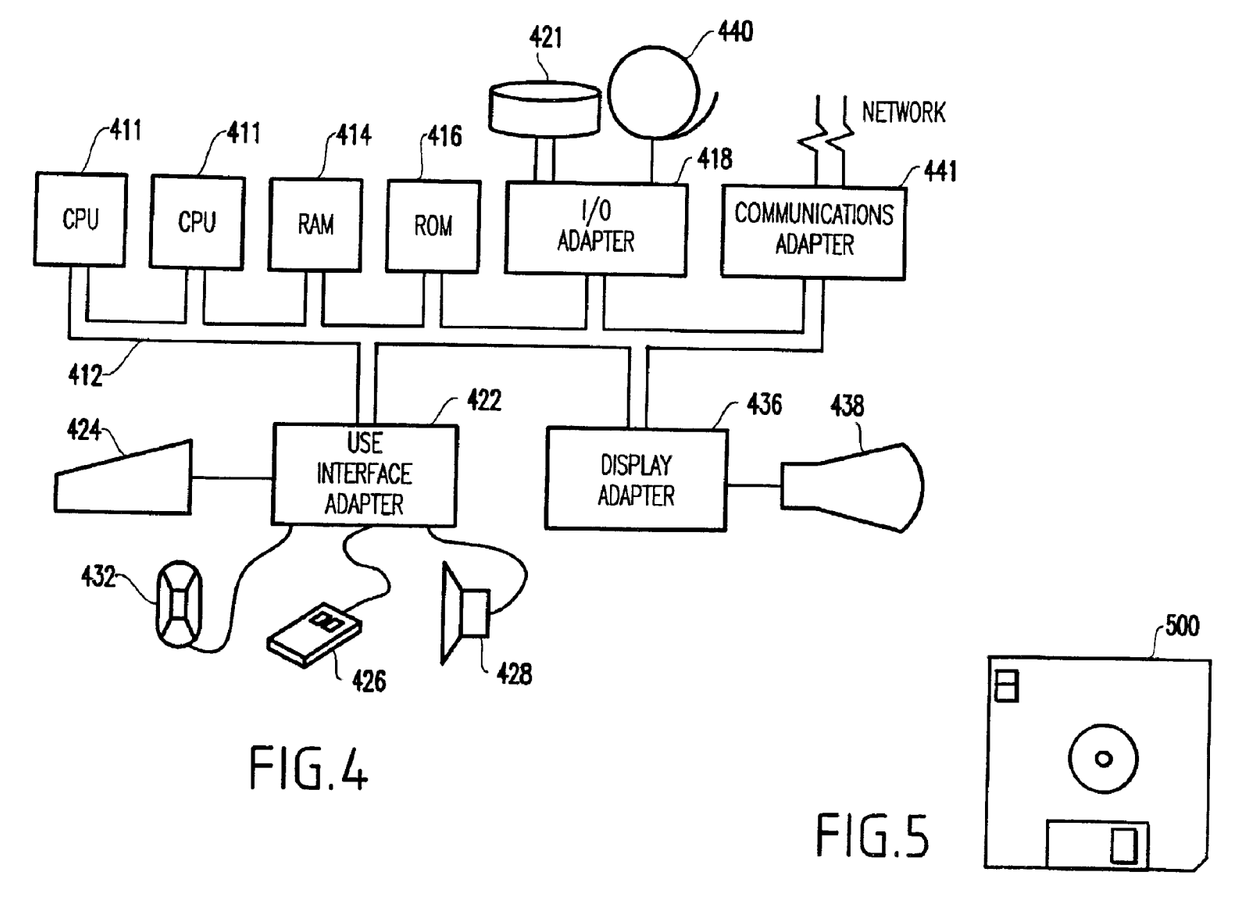
FIG. 4 illustrates an exemplary information handling/computer system for use with the present invention.
FIG. 5 illustrates a storage medium 500 for storing steps of the program for the method according to the present invention.

For example, as illustrated in FIG. 4, a typical hardware configuration of an information handling/computer system for use with the invention. In accordance with the invention, preferably the system has at least one processor or central processing unit (CPU) 411 and more preferably several CPUs 411. The CPUs 411 are interconnected via a system bus 412 to a random access memory (RAM) 414, read only memory (ROM) 416, input/output (I/O) adapter 418 (for connecting peripheral devices such as disk units 421 and tape drives 440 to the bus 412), user interface adapter 422 (for connecting a keyboard 424, an input device such as a mouse, trackball, joystick, touch screen, etc. 426, speaker 428, microphone 432, and/or other user interface device to the bus 412), communication adapter 434 (for connecting the information handling system to a data processing network such as an intranet, the Internet (World-Wide-Web) etc.), and display adapter 436 (for connecting the bus 412 to a display device 438). The display device could be a cathode ray tube (CRT), liquid crystal display (LCD), etc., as well as a hard-copy printer (e.g., such as a digital printer).

In addition to the hardware/software environment described above, a different aspect of the invention includes a computer-implemented method for producing a halftone image. This method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Such a method may be implemented, for example, by operating the CPU 411 (FIG. 4), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 411 and hardware above, to perform the above method.

This signal-bearing media may include, for example, a RAM (not shown in FIG. 4) contained within the CPU 411 or auxiliary thereto as in RAM 414, as represented by a fast-access storage for example. Alternatively, the instructions may be contained in another signal-bearing media, such as a magnetic data storage diskette 500 (e.g., as shown in FIG. 5), directly or indirectly accessible by the CPU 411.

Whether contained in the diskette 500, the computer/CPU 411, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

Thus, with the unique and unobvious aspects of the present invention, a method (and system) are provided which can generate an image such that it looks like $N_1$ under viewing condition 1, it looks like $N_2$ under viewing condition 2, etc.

Further, color characteristics of images printed by a printer or displayed on a display can be maintained as the conditions of the viewing environment change, and which can generate images which look the same even as these viewing conditions change.

Further, in the invention, a halftoned image is generated which attempts to minimize the aggregate error which is a function of the $e_j$_s.

Thus, with the unique and unobvious aspects of the present invention, an image can be generated such that it looks like $N_1$ under viewing condition 1, it looks like $N_2$ under viewing condition 2, etc.

Further, color characteristics can be maintained of images printed by a printer or displayed on a display as the conditions of the viewing environment change. Thus, images can be generated which look the same even as the viewing conditions change (e.g., an image of a baboon under one viewing condition would look the same under another viewing condition).

Hence, with the invention, several different error measures can be considered and, for example, several different colors can be considered such that the color selected has to be constrained. Further, the error diffusion method of the invention tries to minimize the error between what image is output and what the original image actually is. In contrast to the conventional methods, there are a plurality (e.g., two or more) of errors considered. Moreover, in the inventive method, the error diffusion is performed by minimizing an aggregate of the errors (e.g., at the same time), not just one error or the other as in conventional error diffusion. Thus, colors are selected to minimize the errors at each pixel.

While the invention has been described in terms of a single preferred embodiment, those skilled in the art will recognize that the invention can be practiced with modification within the spirit and scope of the appended claims.

What is claimed is:

1. A method for producing a halftoned image, comprising:
    calculating errors corresponding to a plurality of different viewing conditions of a halftoned image; and
    minimizing a function of the errors, such that said halftoned image appears as a different image under different viewing conditions.

2. The method of claim 1, where said function of the errors comprises a sum of absolute values of the errors.

3. The method of claim 1, where said function of the errors comprises a sum of the magnitude of the errors.

4. The method of claim 1, wherein said minimizing comprises:
    at each image pixel, selecting an output pixel color which minimizes the function of the errors for said pixel.

5. The method of claim 1, wherein, for each viewing condition, the corresponding image is different.

6. The method of claim 1, further comprising:
    creating the halftoned image such that said image appears as image $N_j$ under viewing condition j for each j, a plurality of images $N_1, N_2, \ldots$, being embedded into the halftoned image.

7. The method of claim 1, further comprising comparing a value of said function of errors to an upper bound, and if said value is greater than said upper bound, then capping said function value to said upper bound.

8. The method of claim 1, further comprising comparing a value of said function of errors to a lower bound, and if said value is lower than said lower bound, then setting said value to said lower bound.

9. The method of claim 1, wherein said viewing conditions comprise at least one of a viewing angle, a temperature of said image, a humidity of said image, and a lighting condition of said image.

10. The method of claim 1, wherein, for predetermined color formats having a predetermined large number of colors, said image is divided into predetermined channels and said minimizing is applied to each channel independently, and
    wherein all images are expressed in a same color space.

11. The method of claim 6, wherein said images are expressed in different color spaces.

12. The method of claim 10, where said channels comprise red, green and blue color channels.

13. The method of claim 10, where said channels comprise cyan, magenta and yellow color channels.

14. The method of claim 1, wherein a number of displayable colors is minimized to a predetermined size.

15. The method of claim 1, wherein two images are independently halftoned by performing a bilevel error diffusion, such that at each pixel position, the pixels of the two halftoned images form a pixel pair having a plurality of forms, from which an output color is chosen.

16. The method of claim 1, wherein color characteristics of images printed by a printer or displayed on a display are changed as the viewing conditions change.

17. The method of claim 1, wherein color characteristics are maintained of images generated on said display device as the viewing conditions change.

18. The method of claim 1, wherein each column k and row 1 of an image is processed such that the process loops through each pixel of the image.

19. The method of claim 1, wherein, for each pixel of the image a processing is made through each viewing condition.

20. The method of claim 19, wherein for each viewing condition, a modified input image $M_j$ is created, by taking a current input pixel of image $N_j$ along with a weighted sum ($w_j$) of errors ($e_j$) that have been generated previously, and
    wherein with said modified input generated, an index t is selected to determine the output color $c_t$.

21. The method of claim 20, wherein the error $e_j$ that occurs by selecting a particular output ($a_{ij}$) is found for each viewing condition j by subtracting a particular output $a_{ij}$ from the modified output $M_j$ and the sum of the errors $e_j$ is calculated by summing the errors under all of the viewing conditions, and
    wherein the output color is selected which minimizes the summed errors.

22. The method of claim 1, wherein the output selected is $c_t$ and the errors $e_j$ are propagated out to neighboring pixels.

23. The method of claim 22, wherein, for each viewing condition j, an upper and lower bound is applied to the error to prevent said error from becoming larger than a first predetermined value or from becoming smaller than a second predetermined value.

24. The method of claim 1, wherein given images $N_1, N_2, \ldots$, a halftoned image is created which looks like image $N_j$ under viewing condition j for each j,
    wherein $N_j(k,l)$ denotes a (k,l)th pixel of image $N_j$,
    wherein a modified input for a viewing condition j is defined as $$M_j(k, l) = N_j(k, l) + \sum_{u,v} w_j(u, v) e_j(k - u, l - v)$$

where $e_j(k, 1)$ is the error corresponding to viewing condition j at the (k, l)th pixel, and an aggregate error at the (k, l)th pixel for choosing $c_1$ as the o utput pixel color is given by:

$$Err(i, k, l) = \sum_j |M_j(k, l) - a_{ij}|$$

and wherein an output pixel color at the (k,l)-th pixel is defined as:
    $o(k,l) = c_t$ where $t = \text{argmin} Err(i,k,l)$
where $o(k,l)$ is a printable color $c_t$ which minimizes the aggregate error Err.

25. The method of claim 24, wherein the error $e_j(k,l)$ is defined as $Mj(k,l)-amj$ if and only if $o(k,l)=c_m$.

26. The method of claim 24, wherein $w_j$ is the error weights matrix corresponding to an error diffusion algorithm.

27. A method for producing a halftoned image, comprising:

calculating errors corresponding to a plurality of different viewing conditions of a halftone image; and minimizing a function of the errors, such that said halftoned image appears as a same image under the different viewing conditions.

28. The method of claim 27, wherein said function comprises a sum of absolute values of the errors.

29. The method of claim 27, wherein said minimizing comprises:

at each image pixel, selecting an output pixel color which minimizes the function of the errors for said pixel.

30. The method of claim 27, wherein, for each viewing condition, the corresponding image is the same.

31. The method of claim 27, further comprising:

creating the halftoned image such that said image appears as image $N_j$ under viewing condition j for each j, a plurality of images $N_1, N_2, \ldots$, being embedded into the halftoned image.

32. The method of claim 27, further comprising comparing a value of said function of errors to an upper bound, and if said value is greater than said upper bound, then capping said function value to said upper bound.

33. The method of claim 27, further comprising comparing a value of said function of errors to a lower bound, and if said value is lower than said lower bound, then setting said function value to said lower bound.

34. The method of claim 27, wherein said viewing conditions comprise at least one of a viewing angle, a temperature of said image, and a lighting condition of said image.

35. The method of claim 27, wherein, for predetermined color formats having a predetermined large number of color, said image is divided into predetermined channels and said minimizing is applied to each channel independently, and wherein all images are expressed in a same color space.

36. The method of claim 31, wherein said images are expressed in different color spaces.

37. The method of claim 35, where said channels comprise red, green and blue color channels.

38. The method of claim 35, where said channels comprise cyan, magenta and yellow color channels.

39. The method of claim 27, wherein a number of displayable colors is minimized to a predetermined size.

40. The method of claim 27, wherein two images are independently halftoned by a performing a bi-level error diffusion, such that at each pixel position, the pixels of the two halftoned images form a pixel pair having a plurality of forms, from which an output color is chosen.

41. A system for producing a halftoned image, comprising:

a calculator for calculating errors corresponding to a plurality of different viewing conditions of a halftone image; and an error minimizer for minimizing a function of the errors, such that said halftoned image appears as a different image under different viewing conditions.

42. A system for producing a halftoned image, comprising:

a calculator for calculating errors corresponding to a plurality of different viewing conditions of a halftone image; and an error minimizer for minimizing a function of the errors, such that said halftoned image appears as a same image under the different viewing conditions.

43. A signal-bearing medium tangibly embodying a program of machine-readable instructions executable by a digital processing apparatus to perform a method for producing a halftoned image, said method comprising:

calculating errors corresponding to a plurality of different viewing conditions of a halftone image; and minimizing a function of the errors, such that said halftoned image appears as a different image under different viewing conditions.

44. A signal-bearing medium tangibly embodying a program of machine-readable instructions executable by a digital processing apparatus to perform a method for producing a halftoned image, said method comprising:

calculating errors corresponding to a plurality of different viewing conditions of a halftone image; and minimizing a function of the errors, such that said halftoned image appears as a same image under the different viewing conditions.

* * * * *